(12) United States Patent
Ban et al.

(10) Patent No.: US 8,232,344 B2
(45) Date of Patent: Jul. 31, 2012

(54) STRUCTURE, TARGET SUBSTANCE-DETECTING ELEMENT AND TARGET SUBSTANCE-DETECTING KIT

(75) Inventors: Kazuhiro Ban, Tokyo (JP); Masato Minami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 12/145,451

(22) Filed: Jun. 24, 2008

(65) Prior Publication Data
US 2009/0005495 A1    Jan. 1, 2009

(30) Foreign Application Priority Data
Jun. 27, 2007 (JP) ................. 2007-169770

(51) Int. Cl.
*C08L 43/02* (2006.01)
*C08L 33/26* (2006.01)
*C08G 69/08* (2006.01)
*C08G 69/42* (2006.01)

(52) U.S. Cl. ........ 524/547; 528/310; 528/321; 528/363; 524/555

(58) Field of Classification Search ................ 528/310, 528/363
See application file for complete search history.

(56) References Cited

U.S. PATENT DOCUMENTS

| 7,452,819 B2* | 11/2008 | Matsui et al. ................ 438/693 |
| 2007/0105087 A1 | 5/2007 | Ban et al. |
| 2008/0090267 A1 | 4/2008 | Komatsu et al. |
| 2008/0108132 A1 | 5/2008 | Ban et al. |
| 2008/0278706 A1 | 11/2008 | Murayama et al. |
| 2008/0290268 A1 | 11/2008 | Komatsu et al. |
| 2009/0000360 A1 | 1/2009 | Ogawa et al. |

OTHER PUBLICATIONS

U.S. Appl. No. 11/995,911, International Filing Date Sep. 1, 2006, Applicants: Takeshi Imamura, et al.
U.S. Appl. No. 12/065,720, International Filing Date Oct. 3, 2006, Applicants: Kazuhiro Ban, et al.
Zheng Zhang, et al., "Dual-Functional Biomimetic Materials: Nonfouling Poly(carboxybetaine) with Active Functional Groups for Protein Immobilization", Biomacromolecules, vol. 7, No. 12, pp. 3311-3315 (2006).

(Continued)

*Primary Examiner* — John J Figueroa
(74) *Attorney, Agent, or Firm* — Fitzpatrick, Cella, Harper & Scinto

(57) ABSTRACT

According to the present invention, there can be provided a structure preventing the nonspecific adsorption, and a target substance-detecting element and a target substance-detecting kit. A first aspect of the present invention is a structure including: a substrate; and a membrane, present on the surface of the substrate, having a polymer of a monomer represented by the following General Formula (1) or (2):

General Formula (1)

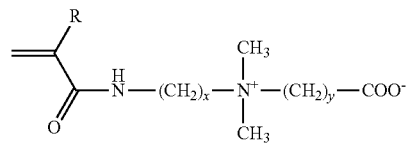

(wherein R represents H or $CH_3$; x represents an integer of 2 to 5, and y represents an integer of 1 to 7, with the proviso that x+y=an integer of 3 to 10), and General Formula (2)

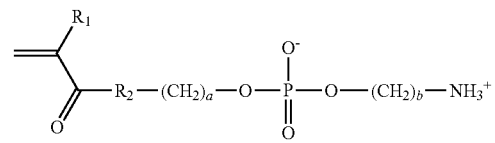

(wherein $R_1$=H or $CH_3$, and $R_2$ represents O or NH; a represents an integer of 2 to 5, and b represents an integer of 1 to 7, with the proviso that a+b=an integer of 3 to 10).

4 Claims, 3 Drawing Sheets

OTHER PUBLICATIONS

Ryoko Iwata, et al., "Control of Nanobiointerfaces Generated from Well-Defined Biomimetic Polymer Brushes for Protein and Cell Manipulations", Biomacromolecules, vol. 5, No. 6, pp. 2308-2314 (2004).

Der-Jang Liaw, et al., "Synthesis and Characteristics of the Poly(carboxybetaine)s and the Corresponding Cationic Polymers", Journal of Polymer Science: Part A: Polymer Chemistry, vol. 35, pp. 3527-3536 (1997).

Shiro Nakai, et al., "Polymeric Phospholipid Analog, 10*) Synthesis and Polymerization of 2-(Methacryloyloxy)ethyl 2-Aminoethyl Hydrogen Phosphate", Makromol. Chem., vol. 178, No. 10, pp. 2963-2967 (1977).

* cited by examiner

STRUCTURE, TARGET SUBSTANCE-DETECTING ELEMENT AND TARGET SUBSTANCE-DETECTING KIT

BACKGROUND OF THE INVENTION

1. Field of the Invention

The present invention relates to a target substance-detecting element having a nonspecific adsorption-preventing capability, a target substance-detecting kit and a structure forming the target substance-detecting element.

2. Description of the Related Art

As a technique to detect a target substance in an analyte, intermolecular interactions have hitherto been utilized. As a technique utilizing intermolecular interactions, generally adopted is a method in which the molecules of the interaction counterpart of the target substance are immobilized as a capturing molecule on the surface of a substrate, and a target substance-containing analyte is brought into contact with the surface to cause the reaction of the target substance with the interaction counterpart.

In the quantitative measurement of the target substance undergoing interaction with the immobilized capturing molecule, depending on the nature of the substrate surface or the immobilization method, there is an unfavorable possibility that some substances nonspecifically adsorbed on the substrate surface are simultaneously detected in addition to the target substance interacting with the capturing molecules. This possibility constitutes a cause for degradation of the lowest detection sensitivity in a sensor required to conduct trace amount detection. Accordingly, there has been demanded a method which exclusively detect a target substance while suppressing nonspecific adsorption.

As a technique to prevent the nonspecific adsorption on the substrate surface, in "Biomacromolecules," 2004, 5, pp. 2308 to 2314, there is disclosed a technique in which by using MPC (2-methacryloyloxyethyl phosphorylcholine) as a monomer on a silicon substrate surface, the MPC polymer is formed on the substrate surface in a high density on the basis of an atom transfer radical polymerization so as to prevent nonspecific adsorption of proteins and to prevent adhesion of cells.

On the other hand, in "Biomacromolecules," 2006, 7, pp. 3311 to 3315, there is disclosed a technique in which by using CBMA (2-carboxy-N,N-dimethyl-N-(2'-methacryloyloxyethyl)ethanaminium inner salt) as a monomer, the CBMA polymer is formed on the SPR (Surface Plasmon Resonance) sensor surface in a high density on the basis of an atom transfer radical polymerization, and thereafter a capturing molecule is immobilized to the carboxyl groups that are the side chain functional groups of the CBMA polymer, and thus the target substance is detected while nonspecific adsorption of contaminants is being prevented.

However, in any of the above-described techniques, the capability of preventing the nonspecific adsorption cannot be said to be sufficient, and there have hitherto been demanded target substance-detecting elements having a further enhanced capability of preventing nonspecific adsorption.

SUMMARY OF THE INVENTION

According to the present invention, there can be provided a target substance-detecting element having a high nonspecific adsorption-preventing capability, a target substance-detecting kit and a structure forming the target substance-detecting element.

A first aspect of the present invention is a structure including: a substrate; and a membrane, present on the surface of the substrate, having a polymer of a monomer represented by the following General Formula (1) or the following General Formula (2):

General Formula (1)

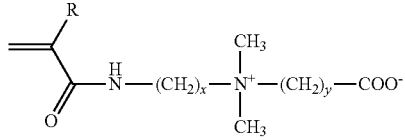

(wherein R represents H or $CH_3$; x represents an integer of 2 or more and 5 or less, and y represents an integer of 1 or more and 7 or less, with the proviso that x+y=an integer of 3 or more and 10 or less), and General Formula (2)

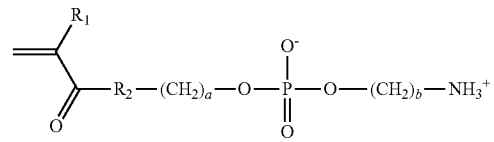

(wherein $R_1$=H or $CH_3$, and $R_2$ represents O or NH; a represents an integer of 2 or more and 5 or less, and b represents an integer of 1 or more and 7 or less, with the proviso that a+b=an integer of 3 or more and 10 or less.)

One end of the polymer is preferably bonded to the substrate.

The polymer is preferably a polymer of the monomer represented by the General Formula (1).

The polymer of the monomer represented by the General Formula (1) is preferably a polymer of a monomer represented by the General Formula (1) and satisfying the relations x=2 and y=1.

Additionally, a second aspect of the present invention is a target substance-detecting element including: a substrate having a detection area; a membrane, present at least on the surface of the detection area, having a polymer of a monomer represented by the following General Formula (1) or the following General Formula (2); and a first target substance-capturing molecule bonded to the polymer:

General Formula (1)

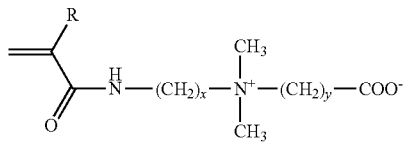

(wherein R represents H or $CH_3$; x represents an integer of 2 or more and 5 or less, and y represents an integer of 1 or more and 7 or less, with the proviso that x+y=an integer of 3 or more and 10 or less), and General Formula (2)

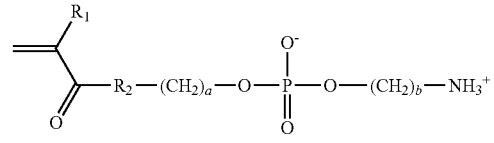

(wherein $R_1$=H or $CH_3$, and $R_2$ represents O or NH; a represents an integer of 2 or more and 5 or less, and b represents an integer of 1 or more and 7 or less, with the proviso that a+b=an integer of 3 or more and 10 or less.)

One end of the polymer is preferably bonded to the detection area.

Additionally, a third aspect of the present invention is a target substance-detecting kit including: the target substance-detecting element; and a labeling material including a labeling substance and a second target substance-capturing molecule present on the surface of the labeling substance.

The detection area having the target substance-detecting element preferably is a detection area capable of detecting a magnetic substance, and the labeling substance having preferably a magnetic substance.

Further features of the present invention will become apparent from the following description of exemplary embodiments with reference to the attached drawings.

Figure 1:
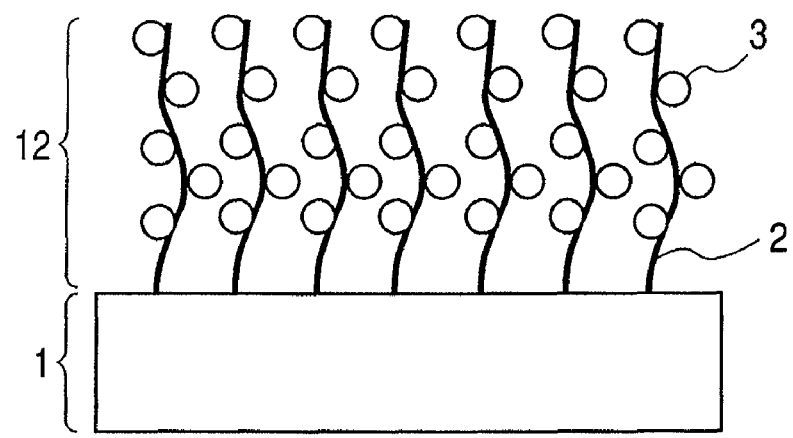
FIG. 1 is a schematic view illustrating an example of the structure of a first aspect of the present invention.

Here, it is to be noted that the reference numerals in these figures are defined as follows:
1 Substrate
2 main chain
3 Side chain functional group
4 First target substance-capturing molecule
5 Detection area
6 Target substance-detecting element
7 Labeling substance
8 Second target substance-capturing molecule
9 Labeling material
10 Target substance
11 Contaminant
12 Nonspecific adsorption-preventing membrane

DESCRIPTION OF THE EMBODIMENTS

First, a structure of a first aspect of the present invention is described.

The structure of the first aspect of the present invention is a structure including: a substrate; and a membrane, present on the surface of the substrate, having a polymer of a monomer represented by the following General Formula (1) or the following General Formula (2):

General Formula (1)

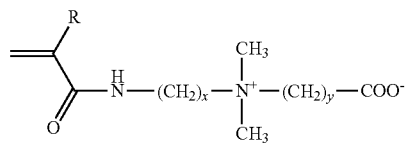

(wherein R represents H or $CH_3$; x represents an integer of 2 or more and 5 or less, and y represents an integer of 1 or more and 7 or less, with the proviso that x+y=an integer of 3 or more and 10 or less), and General Formula (2)

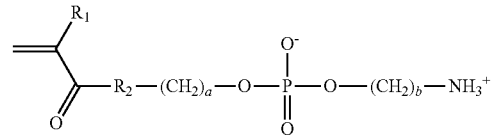

(wherein $R_1$=H or $CH_3$, and $R_2$ represents O or NH; a represents an integer of 2 or more and 5 or less, and b represents an integer of 1 or more and 7 or less, with the proviso that a+b=an integer of 3 or more and 10 or less.)

FIG. 1 is a schematic view illustrating an example of the structure of the first aspect of the present invention.

Hereinafter, the respective members of the structure of the first aspect of the present invention are described.

(Substrate)

The substrate 1 is only required to be a substrate permitting forming on the surface thereof the membrane (hereinafter, referred to as a nonspecific adsorption-preventing membrane, as the case may be) having the polymer of the monomer represented by the General Formula (1) or the General Formula (2).

Examples of the materials usable for forming the surface of the substrate 1 include: metals such as gold, silver, copper, platinum and aluminum, semiconductors such as CdS and ZnS, and metal oxides such as titanium oxide and aluminum oxide wherein an amino group or a thiol group can be bonded to these metals, semiconductors and metal oxides; glass, silicon, titanium oxide and ceramics to each of which a silanol group can be bonded; and ceramics and carbon to each of which a carboxyl group can be bonded. There can also be used plastics capable of presenting carboxyl groups by oxidation of the surface thereof by treatments such as oxygen plasma treatment and UV treatment.

Additionally, the shape of the substrate 1 may be any of a flat plate, a curved plate, a particle, a microstructure, a microtiter plate and the like.

(Nonspecific Adsorption-Preventing Membrane)

The nonspecific adsorption-preventing membrane 12 is made of a polymer of the zwitterionic monomer represented by the General Formula (1) or the General Formula (2):

General Formula (1)

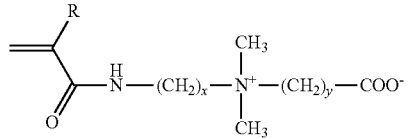

(wherein R represents H or $CH_3$; x represents an integer of 2 or more and 5 or less, and y represents an integer of 1 or more and 7 or less, with the proviso that x+y=an integer of 3 or more and 10 or less), and General Formula (2)

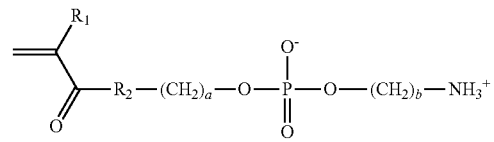

(wherein $R_1$=H or $CH_3$, and $R_2$ represents O or NH; a represents an integer of 2 or more and 5 or less, and b represents an integer of 1 or more and 7 or less, with the proviso that a+b=an integer of 3 or more and 10 or less.)

It is to be noted that in the General Formula (1), the relations x=2 and y=1 are preferably satisfied.

One end of each of the polymer molecules forming the nonspecific adsorption-preventing membrane 12 is preferably immobilized to the substrate 1, and the side chains of the polymer include the zwitterions which are the side chain functional groups preventing the nonspecific adsorption of biological molecules.

The adsorption-preventing capability of the nonspecific adsorption-preventing membrane 12 is displayed because the side chain functional groups 3 and the main chain 2 of the each of the polymer molecules forming nonspecific adsorption-preventing membrane 12 prevent the nonspecific adsorption of a substance to the substrate surface. In the General Formula (1), the carboxybetaine structure as the side chain functional group 3 and the (meth)acrylamide structure as the main chain structure display excellent effects in preventing the nonspecific adsorption. Additionally, the (meth)acrylamide structure of the General Formula (1) can be said to be useful because the (meth)acrylamide structure of the General Formula (1) is more precise and more rapid in polymer extension than the known (meth)acrylic acid ester structure as the case may be. On the other hand, in the General Formula (2), the phosphatidylamine structure as the side chain functional group 3 and the (meth)acrylamide structure or the (meth)acrylic acid ester structure as the main chain 2 display excellent effects in preventing the nonspecific adsorption.

The number average molecular weight of the nonspecific adsorption-preventing membrane 12 on the substrate 1 is preferably 500 or more and 1000000 or less. The molecular weight distribution is preferably 1 or more and less than 2. Additionally, the density of the nonspecific adsorption-preventing membrane is preferably 0.1 molecule/$nm^2$ or more.

As a method for immobilizing to the substrate 1 one end of each of the polymer molecules forming the nonspecific adsorption-preventing membrane 2, there may be adopted a method in which a beforehand polymerized molecules forming nonspecific adsorption-preventing membrane is brought into contact with the surface of the substrate 1 so as to be immobilized to the substrate 1; however, preferable is a immobilizing method in which the polymerization of a monomer is conducted under the conditions that a solution that includes the monomer to be polymerized to form the nonspecific adsorption-preventing membrane 2 is being brought into contact with substrate 1. In this case, first, a polymerization initiating group is immobilized to the substrate, then a monomer is provided under predetermined conditions to conduct polymerization, and thus a high density grafted polymer is preferably constructed on the substrate. In this way, a polymer can be formed on the substrate in a high density in conformity with the substrate surface shape having microscopic variations so as to be compatible with the substrate surface irregularities in such a way that the polymer covers even the recessed portions as well as the raised portions of the substrate surface, even when the substrate flat plate has irregularities of the order of a few nm, or even when the shape of the substrate is of a particle shape or of a microstructure shape.

It is to be noted that the polymerization method is preferably a living radical polymerization. Such a method enables to bond to the substrate one end of each of the polymer molecules forming the nonspecific adsorption-preventing membrane. The bond as referred to herein is preferably a covalent bond or a coordination bond.

(Living Radical Polymerization)

Next, description is made on the immobilizing method in which the polymerization is made under the conditions that the solution that includes the monomer of the polymer molecules forming the nonspecific adsorption-preventing membrane 12 is being brought into contact with the substrate 1. In general, the living radical polymerization permits narrowing the molecular weight distribution of the polymer synthesized, and additionally grafting the polymer layer on the substrate in a high density. Accordingly, the polymerization, based on living radical polymerization, of the zwitterionic monomer represented by the General Formula (1) or the General Formula (2) enables to form a high-density nonspecific adsorption-preventing membrane on the substrate, and enables to immobilize a first target substance-capturing molecule at least partially at the side chain functional groups of the polymer. Examples of the living radical polymerization include: an atom transfer radical polymerization (ATRP) in which an organic halide or the like is adopted as an initiator and a transition metal complex is adopted as a catalyst; a nitroxide mediated polymerization (NMP) in which a radical trapping-agent such as a nitroxide compound is used; and a photoinitiator polymerization in which a radical-trapping agent such as a dithiocarbamate compound is used. In the present invention, the above-described structure may be prepared by any of these methods; however, from the reasons such as easiness in control, the atom transfer radical polymerization is preferably adopted.

(Atom Transfer Radical Polymerization)

When the living radical polymerization is specified to be the atom transfer radical polymerization, the organic halides represented by the following chemical formulas from 1 to 3, or the halogenated sulfonyl compounds represented by the Chemical Formula 4 may be used as the polymerization initiator.

(Chemical Formula 1)

(X: halogen atom)

(Chemical Formula 2)

(X: halogen atom)

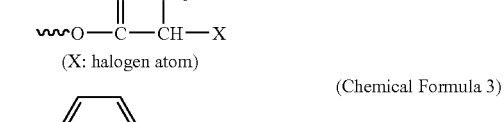

(Chemical Formula 3)

(X: halogen atom)

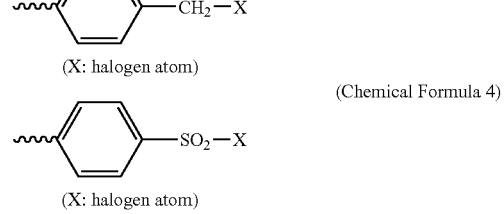

(Chemical Formula 4)

(X: halogen atom)

After the substrate including the atom transfer radical polymerization initiator introduced thereinto has been placed in a reaction solvent, the zwitterionic monomer represented by the General Formula (1) or the General Formula (2) as the monomer of the polymer molecules forming the nonspecific adsorption-preventing membrane and a transition metal complex are added to the reaction solvent, the air in the reaction system is replaced with an inert gas and the atom transfer radical polymerization is conducted. In this way, the polymerization can be made to proceed while the graft density is being maintained to be constant. In other words, the polymerization is made to proceed in a living manner, and the polymer molecules can be made to grow nearly uniformly on the substrate.

The reaction solvent is not particularly limited; however, examples of the usable reaction solvent may include: dimethyl sulfoxide, dimethylformamide, acetonitrile, pyridine, water, methanol, ethanol, propanol, butanol, pentanol, hexanol, heptanol, cyclohexanol, methyl cellosolve, ethyl cellosolve, isopropyl cellosolve, butyl cellosolve, acetone, methyl ethyl ketone, methyl isobutyl ketone, cyclohexanone, ethyl acetate, butyl acetate, ethyl propionate, trioxane and tetrahydrofuran. These may be used each alone or in combinations of two or more thereof.

As the inert gas, nitrogen gas or argon gas may be used.

The transition metal complex to be used is composed of a metal halide and a ligand. Preferable metals as the metal of the transition metal complex are the transition metals of the atomic numbers from 22 to 30, namely, from Ti to Zn, and more preferable among these are Fe, Co, Ni and Cu. Preferable among such metal halides are cuprous chloride and cuprous bromide.

The ligand is not particularly limited as long as the ligand is capable of being coordinated to metal halides; however, examples of the ligands usable as such ligands include: 2,2'-bipyridyl, 4,4'-di-(n-heptyl)-2,2'-bipyridyl, 2-(N-pentyliminomethyl)pyridine, (–)-sparteine, tris(2-dimethylaminoethyl)amine, ethylenediamine, dimethylglyoxim, 1,4,8,11-tetramethyl-1,4,8,11-tetraazacyclotetradecane, 1,10-phenanthroline, N,N,N',N'',N''-pentamethyldiethylenetriamine and hexamethyl(2-aminoethyl)amine.

The addition amount of the transition metal complex is from 0.001 to 10% by weight and preferably from 0.05 to 5% by weight in relation to the zwitterionic monomer to form the nonspecific adsorption-preventing membrane.

The polymerization temperature is set to fall within a range from 10 to 100° C. and preferably within a range from 20 to 80° C.

Additionally, when the polymerization is conducted, a free polymerization initiator that is not immobilized to the substrate may also be added. The free polymer generated from the free polymerization initiator can be used as an index of the molecular weight and the molecular weight distribution in the nonspecific adsorption-preventing membrane grafted to the substrate.

It is preferable to select, as the free polymerization initiator, the same type of polymerization initiator as the atom transfer radical polymerization initiator immobilized to the substrate. Accordingly, the free polymerization initiator is preferably ethyl 2-bromoisobutyrate in relation to the polymerization initiator of the Chemical Formula 1 (X=Br). Additionally, the free polymerization initiator is preferably ethyl 2-bromopropionate in relation to the polymerization initiator of the Chemical Formula 2 (X=Br).

After completion of the polymerization, the substrate is sufficiently washed with the above-described reaction solvent, and thus a substrate in which the nonspecific adsorption-preventing membrane is grafted can be obtained.

(Nitroxide Mediated Polymerization)

When the living radical polymerization is specified to be the nitroxide mediated polymerization, the nitroxide compounds represented by the Chemical Formulas 5 to 7 may be used as the polymerization initiator.

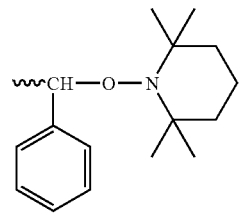

(Chemical Formula 5)

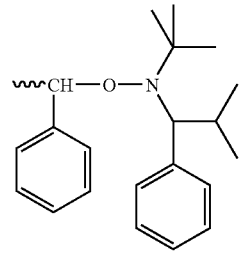

(Chemical Formula 6)

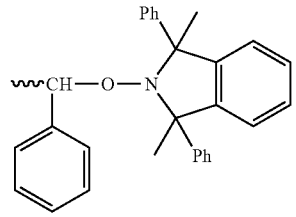

(Chemical Formula 7)

After the substrate including the nitroxide mediated polymerization initiator introduced thereinto has been placed in a reaction solvent, the zwitterionic monomer represented by the General Formula (1) or the General Formula (2) as the monomer of the polymer molecules forming the nonspecific adsorption-preventing membrane is added to the reaction solvent, the air in the reaction system is replaced with an inert gas and the nitroxide mediated polymerization is conducted. In this way, the polymerization can be made to proceed while the graft density is being maintained to be constant. In other words, the polymerization is made to proceed in a living manner, and the polymer molecules can be made to grow nearly uniformly on the substrate.

The reaction solvent is not particularly limited; the same solvents as described above may also be used. Additionally, such solvents may be used each alone, or in combinations of two or more thereof.

As the inert gas, nitrogen gas or argon gas may be used.

The polymerization temperature is set to fall within a range from 10° C. to 120° C. and preferably within a range from 20° C. to 100° C. When the polymerization temperature is lower than 10° C., unpreferably the formed nonspecific adsorption-preventing membrane is low in molecular weight, or unpreferably the polymerization is hardly allowed to proceed.

Additionally, when the polymerization is conducted, a free polymerization initiator that is not immobilized to the substrate may also be added. The free polymer generated from the free polymerization initiator can be used as an index of the molecular weight and the molecular weight distribution in the nonspecific adsorption-preventing membrane grafted to the substrate.

It is preferable to select, as the free polymerization initiator, the same type of polymerization initiator as the nitroxide mediated polymerization initiator immobilized to the substrate. Accordingly, the free polymerization initiator is preferably a nitroxide compound represented by the Chemical Formula 8 in relation to the polymerization initiator of the Chemical Formula 5.

(Chemical Formula 8)

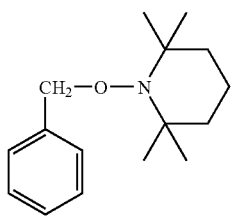

After completion of the polymerization, the substrate is sufficiently washed with the above-described reaction solvent, and thus a substrate in which the nonspecific adsorption-preventing membrane is grafted can be obtained.

(Photoinitiator Polymerization)

When the living radical polymerization is specified to be the photoinitiator polymerization, the N,N-dithiocarbamine compounds represented by the Chemical Formula 9 may be used as the polymerization initiator.

(Chemical Formula 9)

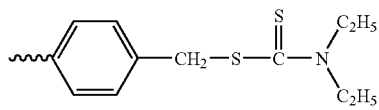

After the substrate including the photoinitiator polymerization initiator introduced thereinto has been placed in a reaction solvent, the zwitterionic monomer represented by the General Formula (1) or the General Formula (2) to form the nonspecific adsorption-preventing membrane is added, the air in the reaction system is replaced with an inert gas and the photoinitiator polymerization is conducted by light irradiation. In this way, the polymerization can be made to proceed while the graft density is being maintained to be constant. In other words, the polymerization is made to proceed in a living manner, and the whole nonspecific adsorption-preventing membrane can be made to grow nearly uniformly on the substrate.

The reaction solvent is not particularly limited; the same solvents as described above may also be used. Additionally, such solvents may be used each alone, or in combinations of two or more thereof.

As the inert gas, nitrogen gas or argon gas may be used.

The wavelength of the irradiated light is varied depending on the type of the photoinitiator polymerization initiator to be used. When a nonspecific adsorption-preventing membrane is grafted to the surface of the substrate including the photoinitiator polymerization initiator illustrated as an example by the Chemical Formula 9, the photoinitiator polymerization is made to proceed satisfactorily by irradiating the reaction system with light of a wavelength of from 300 nm to 600 nm.

The polymerization temperature is preferably set at temperatures equal to or lower than room temperature for the purpose of suppressing side reactions. However, the polymerization temperature is not limited to this temperature range as long as the same effects are obtained.

Additionally, when the polymerization is conducted, a free polymerization initiator that is not immobilized to the substrate may also be added. The free polymer generated from the free polymerization initiator can be used as an index of the molecular weight and the molecular weight distribution in the nonspecific adsorption-preventing membrane grafted to the substrate.

It is preferable to select, as the free polymerization initiator, the same type of polymerization initiator as the photoinitiator polymerization initiator immobilized to the substrate. Accordingly, the free polymerization initiator is preferably a dithiocarbamate compound represented by the Chemical Formula 10 in relation to the polymerization initiator of the Chemical Formula 9.

(Chemical Formula 10)

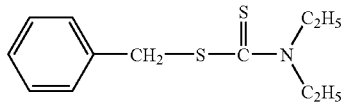

After completion of the polymerization, the substrate is sufficiently washed with the above-described reaction solvent, and thus a structure in which the nonspecific adsorption-preventing membrane is grafted to the substrate surface can be obtained.

In the present invention, the method for immobilizing a polymerization initiator to the substrate surface is not particularly limited; however, when the substrate is formed of a metal, preferable is a method in which a polymerization initiator including a thiol compound is bonded to the substrate surface, or a method in which after the substrate has been pretreated with a thiol compound, successively a polymerization initiator is bonded to the substrate surface.

When the substrate is formed of a metal and the substrate surface is a membrane of the metal oxide, preferable is a method in which a polymerization initiator including a silane coupling agent is bonded to the substrate surface, or a method in which after the substrate has been pretreated with a silane coupling agent, successively a polymerization initiator is bonded to the substrate surface.

When the substrate is made of a plastic, preferable is a method in which after the substrate surface has been oxidized with a technique such as oxygen plasma treatment or UV treatment to develop carboxyl groups on the substrate surface, a polymerization initiator including an amino compound is bonded to the substrate surface, or a method in which after the substrate surface has been pretreated with an amino compound, successively a polymerization initiator is bonded to the substrate surface.

It is to be noted that the zwitterionic monomer represented by the General Formula (1) can be synthesized with reference to J. Polym. Sci., Part A: Polym. Chem. 1997, 35, 3527 to 3536; in other words, as shown by the reaction formula (1) therein, by allowing (meth)acrylamide and a lactone to react with each other, the desired zwitterionic monomer, represented by the General Formula (1), can be obtained.

The zwitterionic monomer represented by the General Formula (2) can be synthesized with reference to Makromol. Chem. 178, 2963-2967 (1977).

It is to be noted that the first aspect of the present invention may be a structure in which the first target substance-capturing molecule is bonded to the nonspecific adsorption-preventing membrane.

In such a case, the structure of the first aspect of the present invention may be referred to as a structure which includes, on a substrate, a nonspecific adsorption-preventing membrane including a first target substance-capturing molecule to capture a target substance, wherein the nonspecific adsorption-preventing membrane is formed of a polymer of a zwitterionic monomer represented by the following General Formula (1) or the following General Formula (2), one end of each of the polymer molecules, forming the nonspecific adsorption-preventing membrane, of the zwitterionic monomer represented by the General Formula (1) or the General Formula (2) is bonded to the substrate included in the structure, and the first target substance-capturing molecule is bonded at least partially to the side chain functional groups of the nonspecific adsorption-preventing membrane. It is to be noted that the bond as referred to herein is preferably a covalent bond or a coordination bond.

Figure 2:
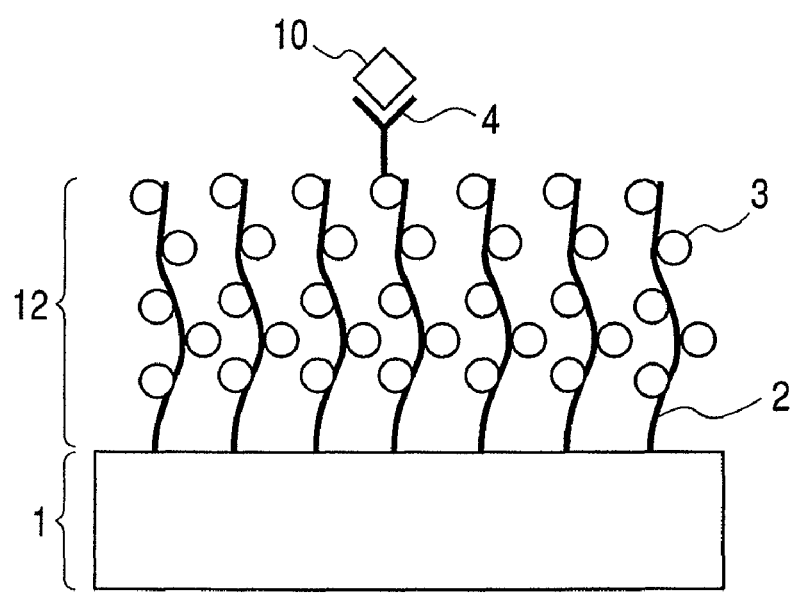
FIG. 2 is a schematic view illustrating an example of the structure of the first aspect of the present invention.

The structure in such a case as described above is described with reference to FIG. 2.

The structure includes the first target substance-capturing molecule 4, and hence the structure is made capable of capturing the target substance 10. Accordingly, when the substrate included in the structure is a labeling substance, the structure can be used as a labeling material.

(Target Substance and First Target Substance-Capturing Molecule)

The first target substance-capturing molecule 4 is only required to be a molecule which captures or transforms the target substance 10 by interacting with the target substance 10. Examples of such a first target substance-capturing molecule 4 include nucleic acids, proteins, sugar chains, lipids and composites of these. Specific examples of such a first target substance-capturing molecule 4 include, but are not limited to, DNAs, RNAs, aptamers, genes, chromosomes, cell membranes, viruses, antigens, antibodies, antibody fragments, lectins, haptens, hormones, receptors, enzymes, peptides, sphingo sugars and sphingo lipids. Preferable among these are antibodies, antibody fragments or enzymes that can capture or transform biological substances.

The target substance 10 is not particularly limited but is only required to be a substance that is capable of reacting with the first target substance-capturing molecule 4. The target substance 10 is more preferably a biological substance. Examples of the biological substance include the biological substances selected from the group consisting of nucleic acids, proteins, sugar chains, lipids and the composites thereof. More particularly, the target substance 10 is composed of the biological molecules selected from the group consisting of nucleic acids, proteins, sugar chains and lipids. Specifically, the present invention may be applied to any substance as long as the substance includes substances selected from the group consisting of any of DNAs, RNAs, aptamers, genes, chromosomes, cell membranes, viruses, antigens, antibodies, lectins, haptens, hormones, receptors, enzymes, peptides, sphingo sugars and sphingo lipids. Further, bacteria and cells themselves producing the above-described "biological substances" may be target substances as the "biological substances" that are the objects of the present invention.

Accordingly, examples of the interactions between the target substance 10 and the first target substance-capturing molecule 4 include the "antigen-antibody reaction," "antigen-aptamer (RNA fragment having a specific structure) interaction," "ligand-receptor interaction," "DNA hybridization," "DNA-protein (such as a transcription factor) interaction," and "lectin-sugar chain interaction."

(Immobilization of First Target Substance-Capturing Molecule)

Examples of the method for immobilizing the first target substance-capturing molecule 4 on the nonspecific adsorption-preventing membrane 2 include a method in which the first target substance-capturing molecule 4 is covalently bonded at least partially to the side chain functional groups 3 of the nonspecific adsorption-preventing membrane 12. For example, when the nonspecific adsorption-preventing membrane 12 is formed of a zwitterionic monomer represented by the General Formula (1), the first target substance-capturing molecule 4 can be immobilized at the —COO⁻ group that is the side chain functional group 3. By using a compound such as N-hydroxysulfosuccinimide or 1-ethyl-3-(3-dimethylaminopropyl)carbodiimide, active esterification is applied to the carboxyl groups that is the side chain functional group 3 of the nonspecific adsorption-preventing membrane 12; and the active esterificated carboxyl group is reacted with the amino group of the first target substance-capturing molecule 4, and thus the first target substance-capturing molecule 4 can be immobilized at the side chain of the nonspecific adsorption-preventing membrane 12.

On the other hand, when the nonspecific adsorption-preventing membrane 12 is formed of a zwitterionic monomer represented by the General Formula (2), the first target substance-capturing molecule 4 can be immobilized at the —NH₃⁺ group that is the side chain functional group 3. By using an agent such as a glutaraldehyde crosslinking agent, the above-described amino group and the amino group of the first target substance-capturing 4 are made to react with each other, and thus, the first target substance-capturing molecule 4 can be immobilized at the side chain of the nonspecific adsorption-preventing membrane 12.

(Target Substance-Detecting Element)

Next, a second aspect of the present invention is described.

The second aspect of the present invention is a target substance-detecting element including; a substrate having a detection area; a polymer, present at least on the surface of the detection area, of a monomer represented by the following General Formula (1) or the following General Formula (2); and a first target substance-capturing molecule bonded to the polymer:

General Formula (1)

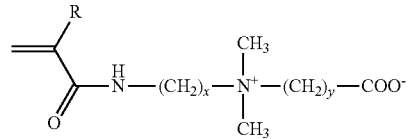

(wherein R represents H or $CH_3$; x represents an integer of 2 or more and 5 or less, and y represents an integer of 1 or more and 7 or less, with the proviso that x+y=an integer of 3 or more and 10 or less), and General Formula (2)

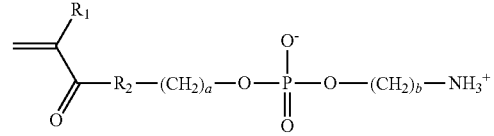

(wherein $R_1$H or $CH_3$, and $R_2$ represents O or NH; a represents an integer of 2 or more and 5 or less, and b represents an integer of 1 or more and 7 or less, with the proviso that a+b=an integer of 3 or more and 10 or less.)

Figure 3:
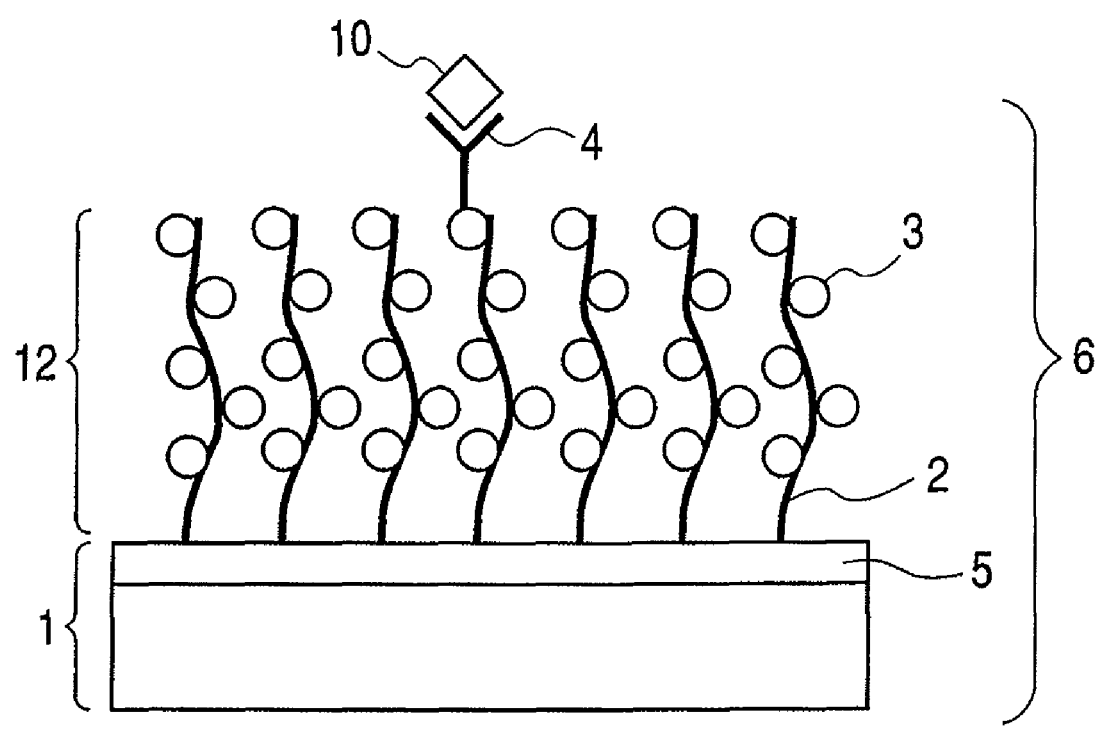
FIG. 3 is a schematic view illustrating an example of the target substance-detecting element of a second aspect of the present invention.

FIG. 3 is a schematic view illustrating the target substance-detecting element of the second aspect of the present invention. Reference numeral 3 denotes a target substance-detecting element.

The substrate 1 has a detection area 5.

The detection area 5 is an area for detecting a captured target substance. The detection area is required to be formed of a material that transmits the signal originated from the captured target substance. For example, when the detection method is based on the surface plasmon resonance (SPR) or the localized surface plasmon resonance (LSPR), the detection area is required to include a material that generates the surface plasmon. When the detection method is based on a quartz crystal oscillator microbalance (QCM), the detection area is required to include a material that varies the oscillation frequency so as to be proportional to the weight of the adsorbed substance. When the detection method is based on an electric field effect transistor (FET), the detection area is required to be formed of a material that can conduct electric current and undergo microfabrication. When the detection method is based on a magnetic sensor, the detection area is required to include a material that extinguishes or reverses magnetic poles relatively readily such as a soft magnetic material. When the detection method is based on electrochemistry, it is preferable to form the detection area surface of a material having a wide electric potential range in which electrochemical reaction is not inhibited. When the detection method is based on light absorption detection, it is preferable to form the detection area of a material that transmits the detection wavelength of light. When the detection method is based on fluorescence detection or emission detection, it is preferable to form the detection area of a material that does not absorb the detection wavelength of light.

Examples of the materials for the detection area include, but are not limited to, gold, silver, copper, platinum, quartz, silicon, germanium, zinc oxide, titanium oxide, silicon oxide, indium oxide, cadmium sulfide, cadmium selenide, gallium arsenide, permalloy (Ni—Fe alloy), a Co—Fe—B alloy, mercury, carbon, diamond, glass and plastics.

These materials for the detection area are often selectively used according to the detection method of the target substance. When the detection method is based on SPR, the material of the detection area is preferably a metal such as gold, silver, copper or platinum; preferable among these is gold. When the detection method is based on a QCM, the material of the detection area is preferably quartz. When the detection method is based on an FET, examples of the material of the detection area include silicon, germanium, zinc oxide, titanium oxide, silicon oxide, indium oxide, cadmium sulfide, cadmium selenide and gallium arsenide. As described above, when the detection method is based on SPR, a QCM or an FET, the target substance can be detected without labeling.

Also, when the detection method is based on a magnetic sensor, the material of the detection area is preferably a soft magnetic material typified by permalloy (Ni—Fe alloy) or a Co—Fe—B alloy. When the detection method is based on electrochemistry, the material of the detection area is preferably gold, platinum, mercury, carbon or diamond. When the detection method is based on light absorption detection, fluorescence detection or emission detection, the material of the detection area is preferably glass or plastic.

The detection area 5 may be located on the surface of the substrate 1, or in the interior of the substrate 1. Examples of the case where the detection area 5 is located on the surface of the substrate 1 include the case where SPR or electrochemistry is applied. When SPR is applied, a metal thin membrane to generate surface plasmon is required to be formed on the surface of the substrate; formation of a nonspecific adsorption-preventing membrane on the metal thin membrane enables to prepare the target substance-detecting element of the present invention. When electrochemistry is applied, a metal layer is required to be formed at least on the surface of a working electrode.

On the other hand, examples of the case where the detection area 5 may be located in the interior of the substrate 1 include the case where a QCM, an FET or a magnetic sensor is applied. When a QCM is applied, formation of a nonspecific adsorption-preventing membrane on the metal thin membrane formed on the surface of the quartz crystal enables to prepare the target substance-detecting element of the present invention. When an FET is applied, formation of a nonspecific adsorption-preventing membrane on the surface of the structure formed of an electric current conducting material enables to prepare the target substance-detecting element of the present invention. When a magnetic sensor is applied, formation of a nonspecific adsorption-preventing membrane on the surface layer of a plurality of layers including permalloy (Ni—Fe alloy) or a Co—Fe—B alloy enables to prepare the target substance-detecting element of the present invention.

As an example of a case where the surface of the substrate 1 serves as the detection area 5, FIG. 3 illustrates a case where the substrate 1 is formed of a plurality of layers, and of the plurality of layers, the layer that includes the surface of the substrate 1 serves as the detection area 5. However, the substrate 1 is not limited to the above-described case, but may be formed of the surface-free layers of the plurality of layers, or the substrate 1 may be formed of a single layer and the configuration of the substrate 1 may be such that the whole substrate 1 serves as the detection area 5.

It is to be noted that the nonspecific adsorption-preventing membrane 2 and the first target substance-capturing molecule 4 are the same as the nonspecific adsorption-preventing membrane and the first target substance-capturing molecule of the first aspect of the present invention.

(Target Substance-Detecting Kit)

Next, a third aspect of the present invention is described.

The third aspect of the present invention is a target substance-detecting kit including: the target substance-detecting element of the second aspect of the present invention; and a labeling material including a labeling substance and a second target substance-capturing molecule.

Figure 4:
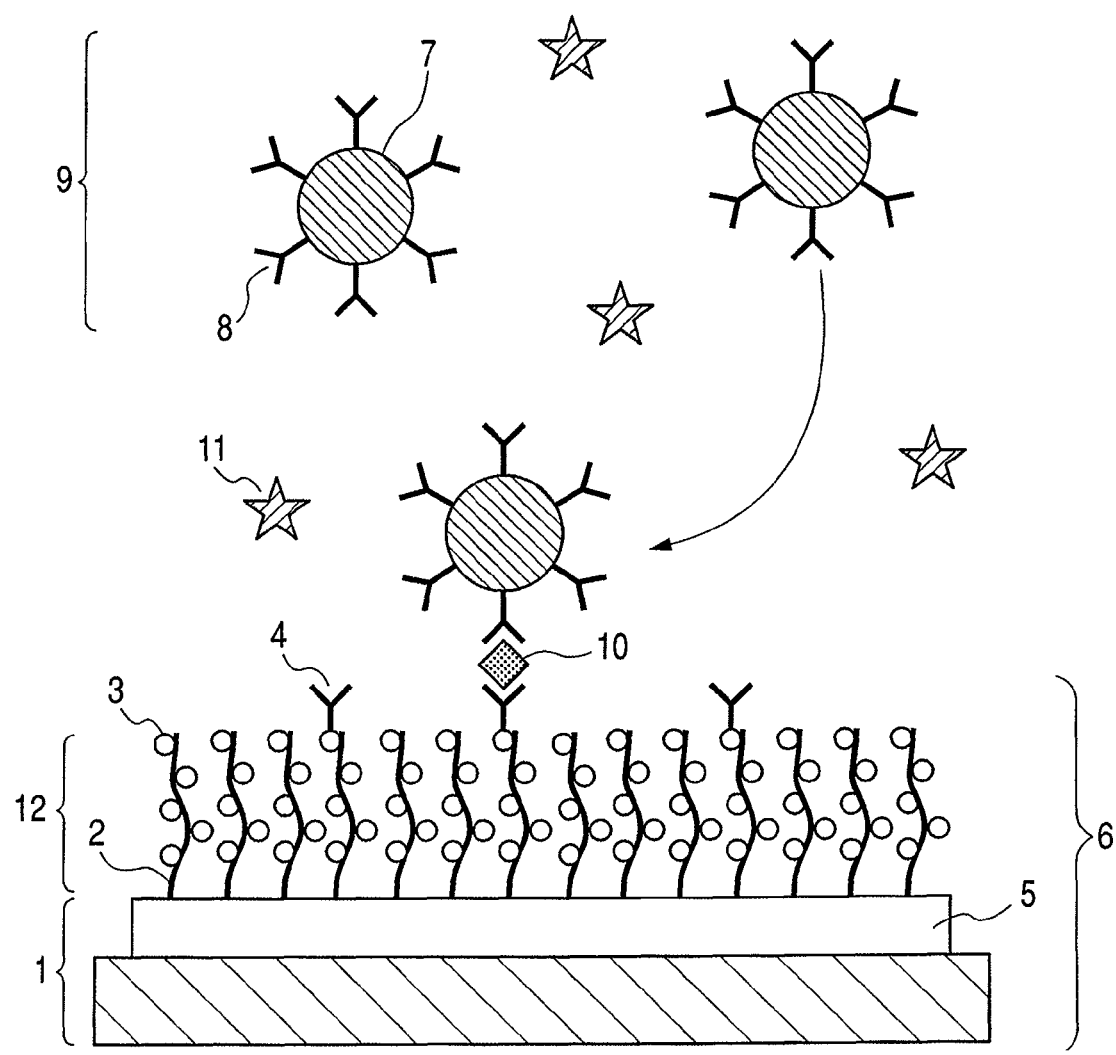
FIG. 4 is a schematic view illustrating an example of a target substance-detecting kit of a third aspect of the present invention.

FIG. 4 illustrates an example of the target substance-detecting kit of the third aspect of the present invention.

The target substance-detecting kit includes the target substance-detecting element 6 and the labeling material 9.

The target substance-detecting element 6 is the same as the target substance-detecting element of the second aspect of the present invention; however, the detection area 5 possessed by the target substance-detecting element 6 is a detection area capable of sensing the labeling substance possessed by the labeling material 9.

The labeling material 9 includes a labeling substance 7 and a second target substance-capturing molecule 8. The second target substance-capturing molecule 8 may bind to the labeling substance 7, or may link to the surface of the labeling substance 7. When the second target substance-capturing molecule 8 bind to the labeling substance 7, the bond between the second target substance-capturing molecule 8 and the labeling substance 7 is preferably a covalent bond, or a coordination bond or a van der waals bond. The bond is more preferably a covalent bond or a coordination bond.

Examples of the labeling substance 7 include gold colloids, latex beads, luminol, ruthenium, enzymes, radioactive substances, fluorescent substances and magnetic substances. Specific examples of the fluorescent substances include quantum dots, fluorescent proteins (such as GFP and the derivatives thereof), Cy3, Cy5, Texas Red, fluorescein and Alexa dyes (such as Alexa 568). Specific examples of the enzymes include horseradish peroxidase, alkaline phosphatase, β-galactosidase and luciferase. Examples of the magnetic substances include ferrite. Ferrite is preferable because ferrite has sufficient magnetic properties under bioactive conditions and hardly undergoes deterioration such as oxidation in solvents. The ferrite is selected from the group consisting of magnetite ($Fe_3O_4$), maghemite ($\gamma$-$Fe_2O_3$), and the composites prepared by partially replacing the Fe in these substances with the atoms of the elements other than Fe. Examples of the elements other than Fe include at least any of Li, Mg, Al, Si, Ca, Sc, Ti, V, Cr, Mn, Co, Ni, Cu, Zn, Ga, Ge, Zr, Nb, Mo, Cd, In, Sn, Ta and W. Additionally, the labeling substance may be a composite of the above cited materials.

Examples of the shape of the labeling substance 7 include a particle shape, a columnar shape and a star shape. The shape of the labeling substance is preferably of a particle shape;

when the shape is of a particle shape, the average particle size is preferably 1 nm to 100 μm, and more preferably 3 nm to 10 μm. When the labeling substance is of a particle shape, the average particle size can be measured by means of dynamic light scattering.

Examples of the usable magnetic substances include Dynabeads commercially available from Dynal Co., Micromer-M and Nanomag-D commercially available from Micromod Co., and Estapol commercially available from Merck & Co., Inc.

The second target substance-capturing molecule 8 is immobilized on the surface of the labeling substance 7 or binds to the labeling substance 7, and has a function to capture the target substance 10 in the same manner as in the first target substance-capturing molecule 4 possessed by the target substance-detecting element 6. Accordingly, examples of the second target substance-capturing molecule 8 are the same as the examples cited for the first target substance-capturing molecule 4. It is to be noted that the second target substance-capturing molecule 8 and the first target substance-capturing molecule 4 are required to capture different portions of the target substance 10. When this is the case, there is formed a composite body having a form in which the second target substance-capturing molecule 8 and the first target substance-capturing molecule 4 sandwich the target substance 10. For example, when the second target substance-capturing molecule 8 and the first target substance-capturing molecule 4 are monoclonal antibodies, these capturing bodies are required to be different in type from each other; however, when these capturing bodies are polyclonal antibodies, these capturing bodies may be either the same in type or different in type from each other; and as the case may be, one capturing molecule is a monoclonal antibody and the other capturing molecule is a polyclonal antibody.

Specifically, the target substance 10 is captured by the first target substance-capturing molecule 4 disposed on the surface of the target substance-detecting element 6, and the target substance 10 captured by the first target substance-capturing molecule 4 is further captured by the second target substance-capturing molecule 8 possessed by the labeling material 9. In other words, there is formed a composite body of the first target substance-capturing molecule 4—the target substance 10—the second target substance-capturing molecule 8, and the labeling material 9 is disposed in the vicinity of the detection area 5 of the target substance-detecting element 6. The labeling substance 7 possessed by the labeling material 9 disposed in the vicinity of the detection area 5 is detected by the detection area 5, and the detection of the labeling substance 7 in the detection area 5 is manifested as the electric or physical signal variation of the target substance-detecting element 6. By utilizing the signal variation of the target substance-detecting element 6, the presence or absence of the target substance or the number of the target substance members are detected.

Here, description is made on the assumption that the target substance 10 is captured by the first target substance-capturing molecule 4, and thereafter the target substance 10 is captured by the second target substance-capturing molecule 8. However, there may occur a case where the target substance 10 is captured by the second target substance-capturing molecule 8, and thereafter the target substance 10 captured by the second target substance-capturing molecule 8 is captured by the first target substance-capturing molecule 4.

Examples of such a combination of the target substance-detecting element 6 and the labeling substance 7 include the following: for example, a combination in which the target substance-detecting element 6 is a magnetic sensor element and the labeling substance 7 is a magnetic substance; a combination in which the target substance-detecting element 6 is an electrode and the labeling substance 7 is an enzyme; and a combination in which the target substance-detecting element 6 is a microtiter plate and the labeling substance 7 is a gold colloid, a latex bead, luminol, ruthenium, an enzyme, a radioactive substance or a fluorescent substance.

As described above, when the target substance-detecting element 6 is a magnetic sensor element, the magnetic sensor element can detect the presence or absence of a magnetic material and the number of the magnetic substance members located in the vicinity of the detection area 5. In such a case, as the target substance-detecting element 6, there can be suitably used an element having a detection area to detect a magnetic property variation such as a magnetoresistance effect element, a Hall effect element or a superconducting quantum interference device.

EXAMPLES

Hereinafter, synthesis examples and examples are presented, and the present invention is described more specifically.

Synthesis Example 1

Synthesis of the Zwitterionic Monomer Represented by the Chemical Formula 11

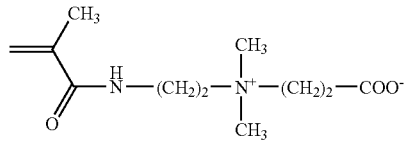

Chemical Formula (11)

N,N-Dimethylaminoethyl methacrylamide is dissolved in anhydrous acetone, and thereafter, to the thus prepared solution, an anhydrous acetone solution containing β-propiolactone is slowly added dropwise at 15° C. under a nitrogen atmosphere. The solution thus obtained is stirred at 15° C. for about 6 hours. The crystalline substance thus prepared is filtered off under suction and washed with anhydrous acetone and successively with anhydrous diethyl ether, and thus the desired zwitterionic monomer represented by the Chemical Formula 11 can be obtained.

Synthesis Example 2

Synthesis of the Zwitterionic Monomer Represented by the Chemical Formula 12

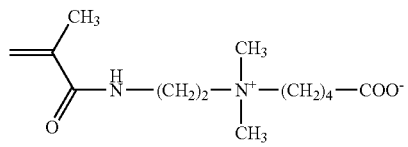

Chemical Formula (12)

The desired zwitterionic monomer represented by the Chemical Formula 12 can be obtained by conducting the same operations as in Synthesis Example 1 except that β-propiolactone is replaced with δ-valerolactone.

Synthesis Example 3

Synthesis of the Zwitterionic Monomer Represented by the Chemical Formula 13

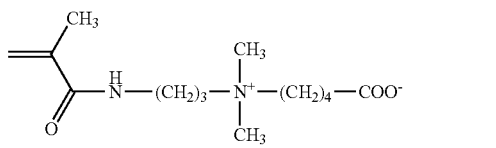

Chemical Formula (13)

The desired zwitterionic monomer represented by the Chemical Formula 13 can be obtained by conducting the same operations as in Synthesis Example 1 except that N,N-dimethylaminoethyl methacrylamide is replaced with N,N-dimethylaminopropyl methacrylamide and β-propiolactone is replaced with δ-valerolactone.

Synthesis Example 4

Synthesis of the Zwitterionic Monomer Represented by the Chemical Formula 14

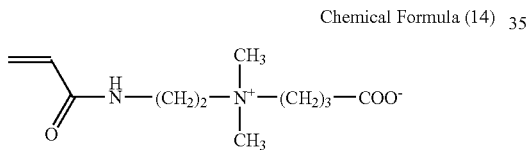

Chemical Formula (14)

The desired zwitterionic monomer represented by the Chemical Formula 14 can be obtained by conducting the same operations as in Synthesis Example 1 except that N,N-dimethylaminoethyl methacrylamide is replaced with N,N-dimethylaminoethyl acrylamide and β-propiolactone is replaced with γ-butyrolactone.

Synthesis Example 5

Synthesis of the Zwitterionic Monomer Represented by the Chemical Formula 15

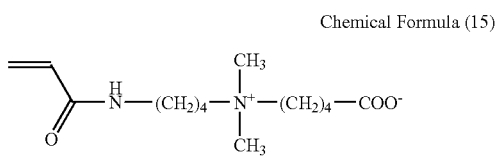

Chemical Formula (15)

The desired zwitterionic monomer represented by the Chemical Formula 15 can be obtained by conducting the same operations as in Synthesis Example 1 except that N,N-dimethylaminoethyl methacrylamide is replaced with N,N-dimethylaminobutyl acrylamide and β-propiolactone is replaced with δ-valerolactone.

Synthesis Example 6

Synthesis of the Zwitterionic Monomer Represented by the Chemical Formula 16

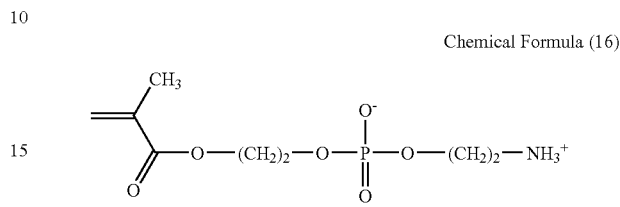

Chemical Formula (16)

The zwitterionic monomer represented by the Chemical Formula 16 can be obtained with reference to Makromol. Chem. 178, 2963 to 2967 (1977).

Specifically, the desired zwitterionic monomer represented by the Chemical Formula 16 can be obtained as follows. 2-Iodoethyl methacrylate and silver benzyl 2-(tritylamino) ethyl phosphate are refluxed in toluene, and thus benzyl 2-(methacryloyloxy)ethyl 2-(tritylamino)ethyl phosphate can be obtained. Next, benzyl 2-(methacryloyloxy)ethyl 2-(tritylamino)ethyl phosphate and sodium iodide are refluxed in acetone, and thus sodium 2-(methacryloyloxy) ethyl 2-(tritylamino)ethyl phosphate can be obtained. Next, sodium 2-(methacryloyloxy)ethyl 2-(tritylamino)ethyl phosphate is heated in 90% acetic acid under stirring, and thus the desired zwitterionic monomer represented by the Chemical Formula 16 can be obtained.

Example 1

Hereinafter, the present invention is described in more detail with reference to Examples, but the present invention is not limited to these Examples, and the materials, composition conditions, reaction conditions and the like can be optionally varied as long as magnetic biosensors having the same functions and advantageous effects are obtained.

(Step of Introducing an ATRP Initiator on a Gold Thin Membrane Substrate)

A gold thin membrane substrate of SIA kit Au (0.3 mm in thickness, 12 mm×10 mm in size, manufactured by Biacore Co., Ltd.) was placed in a container with a lid, and the container was subjected to ultrasonic cleaning. The cleaning was conducted by sequentially pouring into the container acetone, isopropanol and ultrapure water. The gold thin membrane substrate was dried by nitrogen purging, and thereafter set in a UV/$O_3$ cleaner UV-1 (manufactured by Samco Inc.) to be subjected to UV/$O_3$ cleaning under the conditions of 120° C. and 10 minutes. The gold thin membrane substrate and ultrapure water were again placed in the container with a lid to be subjected to ultrasonic cleaning.

In a container with a lid, 10 ml of ethanol, and further, 3.5 mg of 11-mercapto-undexyl 2-bromo-2-methyl-propionate (manufactured by NARD Institute, Ltd.) were added to prepare an ATRP initiator solution. The cleaned gold thin membrane substrate was washed with ethanol, and placed in the container with a lid. The content of the container was stirred with a rotary incubator. The gold thin membrane substrate was further washed in ethanol overnight to prepare a gold thin membrane substrate on which a self-assembly monolayer (hereinafter abbreviated as SAM) was formed of the ATRP initiator. It is to be noted that after drying by nitrogen purging, the dry membrane thickness of the SAM was measured with an ellipsometer M-2000 (manufactured by J. A. Woollam Co., Inc.) and was found to be 1.86±0.08 nm. However, it is preferable to place the substrate in a reaction vessel for polymerization without being dried and after having been washed with the solvent to be used in the polymerization process in the subsequent step.

(Step of Polymerizing on the SAM Surface Made of an ATRP Initiator the Zwitterionic Amide Monomer by Using the ATRP Method)

The SAM-formed substrate was placed in a Schlenk reaction tube and fixed so as not to be brought into contact with the inner wall of the tube. Then, the Schlenk tube was immersed in ice water, and 93 mg of 2,2'-bipyridyl and 1.3 g of dimethylaminoethyl methacrylamide carboxymethyl betaine monomer (abbreviated name: DMAEMAm-CMB, manufactured by Osaka Organic Chemical Industry Ltd.) represented by the Chemical Formula 22 were added in the Schlenk tube, and then methanol/ultrapure water (1/1=w/w) was added in the Schlenk tube so as for the whole volume to be 30 ml. The air in the reaction system was replaced with nitrogen by filling nitrogen in the Schlenk tube with a syringe. In the Schlenk tube, 39 mg of cuprous bromide was added, further the air in the reaction system was replaced with nitrogen, and thereafter, the ATRP was conducted at 23° C. After the 24-hour reaction, the reaction solution was exposed to air, and thus the reaction was terminated to yield a structure.

(Chemical Formula 22)

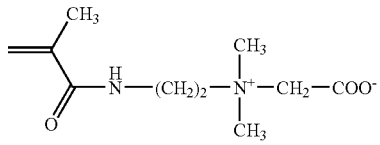

After completion of the reaction, the structure and methanol were placed in a container with a lid, and the structure was washed overnight with a rotary incubator. Similarly, the structure was also washed overnight with ultrapure water. After drying with nitrogen purging, the dry membrane thickness of the graft polymer was measured in the same manner as described above and found to be 15.1±0.2 nm.

(Measurement of Protein Adsorption to Graft Polymer)

A measurement of protein adsorption was conducted with BiacoreX (manufactured by Biacore Co., Ltd.) based on the principle of surface plasmon resonance. By using the obtained graft polymer of DMAEMAm-CMB, a sensor chip was prepared by means of a method of SIA kit Au attachment, and inserted into BiacoreX according to the specified method. With a phosphate buffer solution (pH 7.4), the substrate surface and the flow path were cleaned according to the specified method, and thereafter, the sensorgram was started at a flow rate of 5 μl/min.

Next, the sensorgram was started at a flow rate of 20 μl/min. After verifying that the signal became flat, a protein solution was injected to flow for 2 minutes. Used as the protein solution were a 4% BSA (Bovine Serum Albumin) solution and a 1% BIgG (Bovine Immunoglobulin G) solution. For each of these protein solutions, the signal difference between the signal at 5 minutes after completion of flow of 40 μL of the protein solution and the signal before the flow of the protein solution was measured. Consequently, the adsorption amount for the 4% BSA solution was found to be 4±1 RU and the adsorption amount for the 1% BIgG solution was found to be 6±1 RU (by definition, 1 RU≅1 pg/mm$^2$).

Comparative Example 1

In the same manner as in Example 1, after the introduction of the ATRP initiator on the gold thin membrane substrate, 1.3 g of dimethylaminoethyl methacrylate carboxymethyl betaine monomer (abbreviated name: DMAEMA-CMB, manufactured by Osaka Organic Chemical Industry Ltd.) represented by the Chemical Formula 23 was added and the ATRP was conducted for 24 hours. The substrate was washed, and thereafter dried by nitrogen purging, and the dry membrane thickness of the graft polymer was measured in the same manner as described above and found to be 6.3±0.4 nm. The protein adsorption amount measurement was conducted in the same manner as in Example 1, and consequently the adsorption amount for the 4% BSA solution was found to be 5±1 RU and the adsorption amount for the 1% BIgG solution was found to be 7±2 RU.

(Chemical Formula 23)

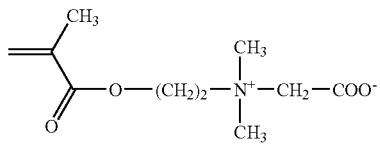

Example 2

Step of Introducing an ATRP Initiator on a Gold Thin Membrane Substrate

A gold thin membrane substrate of SIA kit Au (0.3 mm in thickness, 12 mm×10 mm in size, manufactured by Biacore Co., Ltd.) was placed in a container with a lid, and the container was subjected to ultrasonic cleaning. The cleaning was conducted by sequentially pouring into the container acetone, isopropanol and ultrapure water. The gold thin membrane substrate was dried by nitrogen purging, and thereafter set in a UV/O$_3$ cleaner UV-1 (manufactured by Samco Inc.) to be subjected to UV/O$_3$ cleaning under the conditions of 120° C. and 10 minutes. The gold thin membrane substrate and ultrapure water were again placed in the container with a lid to be subjected to ultrasonic cleaning.

In a container with a lid, 10 ml of ethanol, and further, 3.5 mg of 11-mercapto-undexyl 2-bromo-2-methyl-propionate (manufactured by NARD Institute, Ltd.) were added to prepare an ATRP initiator solution. The cleaned gold thin membrane substrate was washed with ethanol, and placed in the container with a lid. The content of the container was stirred with a rotary incubator. The gold thin membrane substrate was further washed in ethanol overnight to prepare a gold thin membrane substrate on which a self-assembly monolayer (hereinafter abbreviated as SAM) was formed of the ATRP initiator. It is to be noted that after drying by nitrogen purging, the dry membrane thickness of the SAM was measured with an ellipsometer M-2000 (manufactured by J. A. Woollam Co., Inc.) and was found to be 1.86±0.08 nm. However, it is preferable to place the substrate in a reaction vessel for polymerization without being dried and after having been washed with the solvent to be used in the polymerization process in the subsequent step.

(Step of Polymerizing on the SAM Surface Made of an ATRP Initiator the Zwitterionic Amide Monomer by Using the ATRP Method)

The SAM-formed substrate was placed in a Schlenk reaction tube and fixed so as not to be brought into contact with the inner wall of the tube. Then, the Schlenk tube was immersed in ice water, and 93 mg of 2,2'-bipyridyl and 3.2 g of dimethylaminoethyl methacrylamide carboxymethyl betaine monomer (abbreviated name: DMAEMAm-CMB, manufactured by Osaka Organic Chemical Industry Ltd.) represented by the Chemical Formula 22 were added in the Schlenk tube, and then methanol/ultrapure water (1/1=w/w) was added in the Schlenk tube so as for the whole volume to be 30 ml. The air in the reaction system was replaced with nitrogen by filling nitrogen in the Schlenk tube with a syringe. In the Schlenk tube, 39 mg of cuprous bromide was added, further the air in the reaction system was replaced with nitrogen, and thereafter, the ATRP was conducted at 23° C. After the 24-hour reaction, the reaction solution was exposed to air, and thus the reaction was terminated to yield a structure.

(Chemical Formula 22)

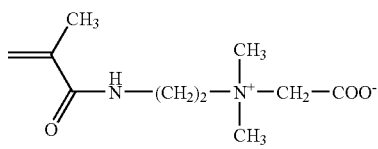

After completion of the reaction, the structure and methanol were placed in a container with a lid, and the structure was washed overnight with a rotary incubator. Similarly, the structure was also washed overnight with ultrapure water. After drying with nitrogen purging, the dry membrane thickness of the graft polymer was measured in the same manner as described above and found to be 19.2±0.4 nm.

(Measurement of Protein Adsorption to Graft Polymer)

A measurement of protein adsorption was conducted with BiacoreX (manufactured by Biacore Co., Ltd.) based on the principle of surface plasmon resonance. By using the obtained graft polymer of DMAEMAm-CMB, a sensor chip was prepared by means of a method of SIA kit Au attachment, and inserted into BiacoreX according to the specified method. With a phosphate buffer solution (pH 7.4), the substrate surface and the flow path were cleaned according to the specified method, and thereafter, the sensorgram was started at a flow rate of 5 µl/min. Thereafter, for the purpose of immobilizing an antibody, a mixed solution of N-hydroxysulfosuccinimide and 1-ethyl-3-(3-dimethylaminopropyl)carbodiimide was prepared, and a specified amount of the mixed solution was injected. Next, an acetate buffer solution (pH 4) of a primary antibody capturing PSA (prostatic-specific antigen) was prepared, and injected to flow for 20 minutes. The PSA antibody was verified to be immobilized in 100 RU with a monitor. Further, an ethanolamine solution was injected in a specified amount and the active sites were subjected to blocking.

Next, the sensorgram was started at a flow rate of 20 µl/min. After verifying that the signal became flat, a protein solution was injected to flow for 2 minutes. Used as the protein solution were a 4% BSA (Bovine Serum Albumin) solution and a 1% BIgG (Bovine Immunoglobulin G) solution. For each of these protein solutions, the signal difference between the signal at 5 minutes after completion of flow of 40 µL of the protein solution and the signal before the flow of the protein solution was measured. Consequently, the adsorption amount for the 4% BSA solution was found to be 4±1 RU and the adsorption amount for the 1% BIgG solution was found to be 5±1 RU (by definition, 1 RU≅1 pg/mm$^2$).

Comparative Example 2

In the same manner as in Example 2, after the introduction of the ATRP initiator on the gold thin membrane substrate, 3.2 g of dimethylaminoethyl methacrylate carboxymethyl betaine monomer (abbreviated name: DMAEMA-CMB, manufactured by Osaka Organic Chemical Industry Ltd.) represented by the Chemical Formula 23 was added and the ATRP was conducted for 24 hours. The substrate was washed, and thereafter dried by nitrogen purging, and the dry membrane thickness of the graft polymer was measured in the same manner as described above and found to be 18.1±0.7 nm. The antibody was immobilized in the same manner as in Example 1, the protein adsorption amount measurement was conducted, and consequently the adsorption amount for the 4% BSA solution was found to be 15±9 RU and the adsorption amount for the 1% BIgG solution was found to be 20±1 RU.

(Chemical Formula 23)

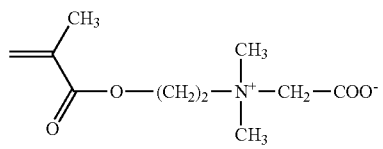

Example 3

In the present example, there are prepared a target substance-detecting element (hereinafter referred to as a magnetic biosensor) in which a nonspecific adsorption-preventing membrane including a primary antibody that captures PSA (prostatic-specific antigen) while serving as the first target substance-capturing molecule is formed in the detection area, and a magnetic material made of a magnetite including a secondary antibody that captures PSA while serving as the second target substance-capturing molecule; and by using such a target substance-detecting element and such a magnetic material as a magnetic biosensor, PSA is detected. It is to be noted that the detection method for the magnetic biosensor uses a magnetoresistance effect element.

(1) Preparation of the Magnetic Material

First, prepared is a magnetic material including the secondary antibody that captures PSA while serving as the second target substance-capturing molecule.

Magnetite particles (average particle size: 100 nm) are heat treated under dry nitrogen atmosphere, and thereafter dispersed in anhydrous toluene. To the magnetite particle/toluene dispersion liquid, aminopropyltrimethoxysilane that is a silane coupling agent is added, and thus the amino group is introduced on the surface of the magnetite particles. Further, for the purpose of immobilizing the secondary antibody, by using a glutalaldehyde crosslinking agent, the above-described amino group and the amino group of the secondary antibody are covalently bonded to each other, and thus the secondary antibody that captures PSA while serving as the second target substance-capturing molecule can be immobilized.

By performing the above-described operations, the magnetic material provided with the second target substance-capturing molecule can be obtained.

(2) Preparation of the Magnetic Biosensor

Next, prepared is the magnetic biosensor in which a nonspecific adsorption-preventing membrane including a primary antibody that captures PSA while serving as the first target substance-capturing molecule is formed in the detection area.

First, an Au membrane is formed on the top surface of the detection area of the magnetic biosensor. In present Example, the detection method uses a magnetoresistance effect element, and hence the detection area means a magnetoresistance effect membrane.

Next, the nonspecific adsorption-preventing membrane is formed on the Au surface that is the detection area. First, an Au membrane is immersed in an ethanol solution that contains a precursor, represented by the Chemical Formula 17, of the atom transfer radical polymerization initiator group, the precursor and the Au membrane are reacted with each other, and thus the atom transfer radical polymerization initiator group can be introduced on the surface of the Au membrane.

Chemical Formula (17)

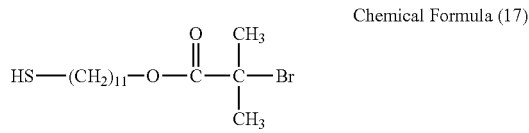

Next, the detection area into which the atom transfer radical polymerization initiator group has been introduced is immersed in methanol, thereafter ethyl 2-bromoisobutyrate is added as a free polymerization initiator to the methanol, and then CuBr and 2,2'-bipyridyl are added to the methanol. The oxygen in the reaction system is removed by freeze vacuum deaeration, then the atmosphere of the reaction system is replaced with nitrogen, and the zwitterionic monomer represented by the Chemical Formula 11 is allowed to react for a predetermined reaction time by atom transfer radical polymerization. Additionally, the molecular weight and the molecular weight distribution of the polymer generated from the ethyl 2-bromoisobutyrate having been added as the free polymerization initiator are measured, and the number average molecular weight and the molecular weight distribution are found to be 53000 and 1.10, respectively. Consequently, it can be verified that the graft polymer grafted to the detection area is uniform in chain length.

Chemical Formula (11)

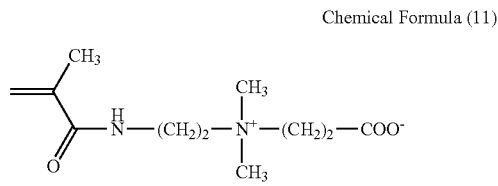

By measuring the membrane thickness and the weight of the nonspecific adsorption-preventing membrane grafted to the detection area, the graft density of the nonspecific adsorption-preventing membrane is found to be 0.62 molecule/nm$^2$.

Next, the primary antibody that captures PSA while serving as the first target substance-capturing molecule is immobilized at least part of the carboxyl groups that are the side chain functional groups of the nonspecific adsorption-preventing membrane formed on the detection area. First, the detection area is coated in the same way with an aqueous solution of N-hydroxysulfosuccinimide and an aqueous hydrochloric acid solution of 1-ethyl-3-(3-dimethylaminopropyl)carbodiimide. By these operations the succinimide groups are exposed to the carboxyl groups that are the side chain functional groups of the nonspecific adsorption-preventing membrane. The succinimide group and the amino group of the primary antibody are allowed to react with each other, and thus the primary antibody that captures PSA while serving as the first target substance-capturing molecule can be immobilized. It is to be noted that the unreacted succinimide groups bound to the surface of the Au membrane may be detached by adding hydroxylamine hydrochloride.

The above-described operations enable to prepare the magnetic biosensor having the detection area provided with the nonspecific adsorption-preventing membrane including the primary antibody that captures PSA while serving as the first target substance-capturing molecule.

(3) Detection of PSA

By using the magnetic material and the target substance-detecting element (hereinafter, referred to as the magnetic biosensor as the case may be) having a detection area to detect a magnetic property variation, prepared in the above (1) and (2), respectively, and by conducting the following operations, a detection of PSA known as a marker of prostate cancer can be attempted.

1) The detection area of the above-described magnetic biosensor is immersed in a phosphate buffer solution that contains PSA as the target substance (antigen) and BSA and IgG as contaminants.

2) The unreacted PSA and the contaminants are washed away with a phosphate buffer solution.

3) The detection area of the magnetic biosensor that have undergone the steps 1) and 2) is immersed in a phosphate buffer physiological saline that contains the magnetic material, and incubated for 5 minutes.

4) The unreacted magnetic material is washed away with a phosphate buffer solution.

By conducting the above-described operations, the antigen is captured by the primary antibody and the secondary antibody, and the magnetic material is immobilized on the detection area of the magnetic biosensor, as illustrated in FIG. 4. In other words, when no antigen is present in the analyte, the magnetic material is not immobilized on the detection area of the magnetic biosensor, and hence the detection of the presence or absence of the magnetic material enables to detect the antigen. Additionally, by detecting the number of the immobilized magnetic material members, the amount of the antigen contained in the analyte can also be indirectly found. The nonspecific adsorption-preventing membrane of the detection area in the magnetic biosensor of present Example can prevent nonspecific adsorption of the contaminants contained in the analyte and the target substance, and hence can detect the target substance in a high sensitivity.

Additionally, when the structure of the present invention is used in the reaction zones and the flow paths in the analyte tests such as gene tests, biochemical tests and immunological tests, the nonspecific adsorption of the contaminants contained in the analytes can be prevented. Also, by coating the surface of the medical devices such as syringes and catheters with graft polymers, the foreign body reaction in the body can be suppressed. Further, when the target substance-detecting element of the present invention is used for the medical imaging molecular probes such as contrast medium, the foreign body reaction in the body is suppressed, and additionally the dispersibility of the molecular probes can be enhanced. The present invention can also be effectively used for the purpose of preventing the fogging and staining of the surface of the members in such a way that the surface of the lenses in a camera, a video camera and an insertion device of the cataract treatment is coated with graft polymers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-169770, filed Jun. 27, 2007, which is hereby incorporated by reference herein in its entirety.

What is claimed is:

1. A target substance-detecting element comprising:
a substrate having a detection area;
a membrane, present at least on the surface of the detection area, having a polymer of a monomer represented by the following General Formula (1) or the following General Formula (2); and
a first target substance-capturing molecule bonded to the polymer:

General Formula (1)

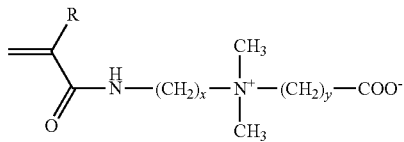

wherein R represents H or CH$_3$; and x represents an integer of 2 or more and 5 or less, and y represents an integer of 1 or more and 7 or less, with the proviso that x+y=an integer of 3 or more and 10 or less; and General Formula (2)

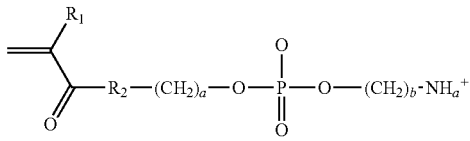

wherein R$_1$=H or CH$_3$, and R$_2$ represents O or NH; and a represents an integer of 2 or more and 5 or less, and b represents an integer of 1 or more and 7 or less, with the proviso that a+b=an integer of 3 or more and 10 or less.

2. The target substance-detecting element according to claim 1, wherein one end of the polymer is bonded to the detection area.

3. A target substance-detecting kit comprising:

the target substance-detecting element according to claim 1; and a labeling material comprising a labeling substance and a second target substance-capturing molecule.

4. The target substance-detecting kit according to claim 3, wherein the detection area possessed by the target substance-detecting element is a detection area capable of detecting a magnetic substance, and the labeling substance has a magnetic substance.

* * * * *